United States Patent
Caspi et al.

(10) Patent No.: US 7,899,863 B2
(45) Date of Patent: Mar. 1, 2011

(54) APPARATUS AND METHOD FOR ENHANCED SYNCHRONIZATION USING AN IMS SERVER

(75) Inventors: Rami Caspi, Sunnyvale, CA (US); William J. Beyda, Cupertino, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1072 days.

(21) Appl. No.: 10/922,655

(22) Filed: Aug. 18, 2004

(65) Prior Publication Data

US 2006/0041687 A1    Feb. 23, 2006

(51) Int. Cl.
G06F 15/16    (2006.01)

(52) U.S. Cl. ............... 709/204; 709/202; 709/205; 709/248

(58) Field of Classification Search ............ 709/248, 709/204, 226; 455/416, 466; 379/142.15; 715/751
See application file for complete search history.

(56) References Cited

U.S. PATENT DOCUMENTS

| | | | | |
|---|---|---|---|---|
| 5,729,687 A * | 3/1998 | Rothrock et al. | ............ | 709/204 |
| 5,996,002 A * | 11/1999 | Katsurabayashi et al. | ... | 709/204 |
| 6,108,687 A * | 8/2000 | Craig | ............ | 709/203 |
| 6,640,241 B1 * | 10/2003 | Ozzie et al. | ............ | 709/204 |
| 6,654,032 B1 * | 11/2003 | Zhu et al. | ............ | 715/753 |
| 6,728,753 B1 * | 4/2004 | Parasnis et al. | ............ | 709/203 |
| 6,820,055 B2 * | 11/2004 | Saindon et al. | ............ | 704/235 |
| 6,865,599 B2 * | 3/2005 | Zhang | ............ | 709/218 |
| 7,051,071 B2 * | 5/2006 | Stewart et al. | ............ | 709/204 |
| 7,167,898 B2 * | 1/2007 | Sato et al. | ............ | 709/204 |
| 7,251,675 B1 * | 7/2007 | Kamakura et al. | ............ | 709/204 |
| 7,337,325 B2 * | 2/2008 | Ikegami et al. | ............ | 713/182 |
| 2002/0103864 A1 * | 8/2002 | Rodman et al. | ............ | 709/204 |
| 2003/0014488 A1 * | 1/2003 | Dalal et al. | ............ | 709/204 |
| 2003/0172160 A9 * | 9/2003 | Widegren et al. | ............ | 709/226 |
| 2003/0191805 A1 * | 10/2003 | Seymour et al. | ............ | 709/204 |
| 2004/0008635 A1 * | 1/2004 | Nelson et al. | ............ | 370/260 |
| 2004/0158586 A1 * | 8/2004 | Tsai | ............ | 707/200 |
| 2005/0097169 A1 * | 5/2005 | Mukherjee et al. | ............ | 709/204 |
| 2005/0278424 A1 * | 12/2005 | White | ............ | 709/204 |
| 2006/0020665 A1 * | 1/2006 | Hagale et al. | ............ | 709/204 |

* cited by examiner

*Primary Examiner*—John Follansbee
*Assistant Examiner*—Madhu Woolcock

(57) ABSTRACT

Some embodiments provide a system for synchronizing participant copies of presentation data during a collaboration session. A presenter/server controlling the session sends synchronization commands when a change in state of the presentation data occurs. The synchronization commands can be received by a mobile communication device and then forwarded to the participant computer system where it is used to synchronize the copy of the presentation data with the presenter/server.

75 Claims, 5 Drawing Sheets

US 7,899,863 B2

APPARATUS AND METHOD FOR ENHANCED SYNCHRONIZATION USING AN IMS SERVER

CROSS-REFERENCE TO RELATED APPLICATIONS

The present application is related to a commonly-assigned, co-pending U.S. patent application Ser. No. 10/922,648, entitled "Apparatus and Method for a Synchronized. Mobile Communication" which is being filed concurrently herewith.

BACKGROUND

1. Field

This application relates generally to conferencing and collaboration.

2. Related Art

Data collaboration sessions typically require a participant's computer to utilize and thus be connected to the Internet or a company intranet. Data collaboration sessions often involve one of the participants to present data such as a PowerPoint™ slide or images in an active manner while other participants view the presented data in a passive manner. In some cases, the collaboration session is presented to all of the participants by a server application or by other automated means. Technologies such as OpenScape™, LiveMeeting™, NetMeeting™ and WebEx™ can assist with launching and managing such data collaboration sessions, but require the passive and active participants to be connected to a data network where they can access a high-bandwidth connection (such as DSL (Digital Subscriber Line or even a modem connection). However, often participants will be operating remotely where a high-bandwidth connection or any data connection for that matter is not readily available. Such participants may have available a computer system such as a laptop and some other messaging device such as a cellular telephone which can be utilized for voice/text interactivity, but not have a high-bandwidth data connection available.

There is thus a need for enhancing remote participation in a data collaboration session without a data connection of any sort.

BRIEF DESCRIPTION OF THE DRAWINGS

Some embodiments are illustrated in the accompanying figures, in which like reference numerals designate like parts, and wherein.

DETAILED DESCRIPTION

Some embodiments provide an apparatus and method for remote synchronization in a data collaboration session using a computing device and a mobile communications device. In some embodiments, the computing device is a laptop, PDA (Personal Digital Assistant) or desktop computer. In some embodiments, the mobile communication device is a cellular telephone. In other embodiments, the computing device and mobile communication device capabilities may be integrated into a single device such as in a PDA equipped with cellular network connectivity. The data collaboration session is configured and established by a presenter/server.

The invention, in various embodiments, is implemented by taking advantage of the fact that in data collaboration sessions, copies of the data to be presented are often available to participants prior to the commencement of the session. For instance, in a conference call involving the use of slides, the slides may be e-mailed to conference participants prior to the conference taking place such that the copies are "local" to the participants. The presentation data (such as slides) may change state (move forward to the next slide) at the presenter/server during the collaboration session. The presenter/server sends synchronization commands, representing this state change, to the participants. In some embodiments of the invention, the data, signaling or messaging channel of a cellular/wireless network is utilized to send/receive synchronization commands and feedback. In at least some embodiments, a mobile communications device such as a cellular telephone is connected via a data interface to a computing device such as laptop to transfer synchronization commands or feedback between the mobile communication device and the computing device. In some devices where a mobile communication capability is integrated with a computing or data processing capable device (used for viewing the presentation data) the need for an explicit interface is eliminated.

The synchronization commands would be sent from the collaboration application of the presenter/server to an application server which can communicate with the mobile communication device. The application server forwards the synchronization commands to the mobile communications device. The synchronization commands are in turn transferred to a participant's computer system ("synchronization destination") via an interface which couples the mobile communication device thereto. The synchronization destination uses a control application or applet to cause the local copy of the presentation data to be synchronized with the presenter/server. Synchronization commands maybe forwarded to multiple synchronization destinations, if desired. Likewise, synchronization feedback, such as a mouse click or other data can be forwarded from the participant to the presenter/server using the same or similar pathway.

Figure 1:
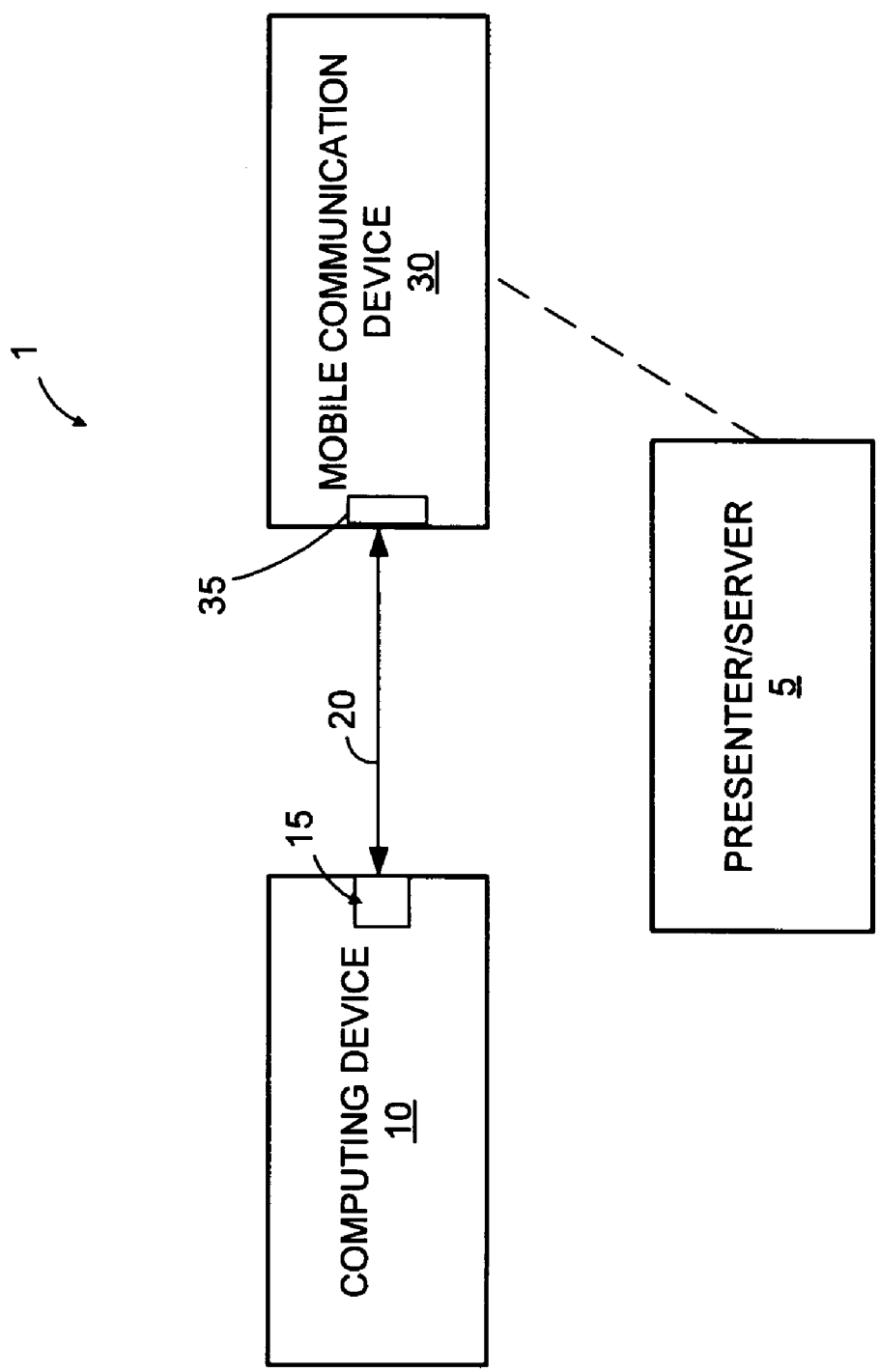
FIG. 1 is a block diagram of a system according to some embodiments of the invention.

FIG. 1 is a block diagram of a system according to some embodiments. System 1 includes presenter/server 5, computing device 10, pathway 20 and mobile communication device 30. The computing device 10 includes a port 15 for communicating or coupling with other devices. Likewise, mobile communication device 30 includes a port 35. One or more participants of the collaboration session would have a computing device 10 and mobile communication device 30 or a device integrating both of these. Some embodiments are generally described below with respect to FIG. 1, with more detailed descriptions thereof to follow.

Presenter/server 5 may be a computer system or similar device which is capable of running a collaboration application such as OpenScape™ or WebEX™. The collaboration session is initiated by a user (or automated task) configuring the collaboration session on the presenter/server 5 and may include definitions/locations of the participants, timetables, device associations for participants, and so forth. The collaboration session may also include voice conferencing and/or video conferencing which can be configured as desired. This may include the presenter/server 5 utilizing an associated telephony device such as land-line telephone or cellular telephone. The establishment of a typical conferencing/collaboration session is well-known in the art. For each participant in the session, his/her mobile communication device 30 or other telephony device (not shown) may be utilized for providing interactivity during the call/session including, for instance, voice interactivity with presenter/server 5. In accordance with the invention, the mobile communication device 30 would be associated with a particular participant or participants, and more precisely, a "synchronization destination" where the presentation data is available to be viewed. There may be multiple synchronization destinations, each supporting one participant or a group of participants. The data is configured with an identification of the master presenter (presenter/server 5), a file name corresponding to the presentation data and identification of the synchronization destination(s).

The presenter/server 5 uses a secondary application such as an OpenScape® (a communications suite developed by Siemens AG) service which enables the collaboration application to send synchronization commands and receive synchronization feedback to/from synchronization destinations. The secondary application communicates synchronization information (commands and feedback) with an IMS Server (IP Multimedia Subsystem) or other similar mobile application server. The IMS Server is an application server developed by Siemens AG for transacting data with mobile communication devices. The mobile application server communicates synchronization information to/from mobile communication device 30.

The mobile communication device 30 can be an analog cellular telephone and/or a digital cellular telephone, or satellite-based mobile phone or any wireless communication device, such as a Blackberry™. Examples of such devices include CDMA (Code Division Multiple Access) based devices, TDMA (Time Division Multiple Access), W-CDMA (Wideband CDMA) or GSM (Global System for Mobile communications). In some embodiments, the mobile communication device 30 may be a 2G, 2.5G, 3G, or 3gPP enabled device. The mobile communication device 30 typically has a data channel (such as GPRS (General Packet Radio Service) or messaging channel (such as an SMS (Short Message Service) channel) and may be capable of transacting data with other networks using WAP (Wireless Application Protocol) and the like. Using one or more of these capabilities, the mobile communication device can receive a synchronization command or send synchronization feedback to the presenter/server 5.

Mobile communication device 30 would utilize port 35 or a suitable signaling system to transact data with computing device 10 over pathway 20. For instance, mobile communication device 30 may include a Bluetooth port or IrDA (Infrared Data Association) port which allows communication with computing device 10 in a wireless fashion. In such cases, the pathway 20 may simply be air. In other embodiments, USB (Universal Serial Bus) or similar wired connectivity can be used such that pathway 20 is a cable, wire or pins. In either case, the port 35 and a port 15 on the computing device 10 would be compatible and/or interoperable. For instance, both port 15 and port 35 could be IrDA ports with the interface 20 being air. The establishment of a communication or data session between computing device 10 and mobile communication device 30 using ports 15 and 35 is well-known in the art, and will not be described further. The type of ports/interfaces available are numerous and examples given are not intended to be limiting.

In yet other embodiments of the invention, the mobile communication device 30 may be integrated as a function of computing device 10 or vice-a-versa. An example of such an integrated device is a PDA with cell phone capability built-in, such as a Handspring Treo communicator. In such embodiments, the need for an external interface between computing device 10 and mobile communication device 30 is eliminated since data can be transferred via some internal mechanism.

In accordance with various embodiments of the invention, computing device 10 would be utilized by a participant in a conference call and/or data collaboration session to view presentation data such as slides. For this purpose, the computing device 10 may run one or more personal application programs such as PowerPoint™ which load the presentation data and make it available to the participant. It is assumed that the computing device 10 does not have access to or need not utilize, even if available, a high-speed packet data network connection such as an IP (Internet Protocol) connection. Such connections are traditionally made available using a data connection service such as DSL, T1, analog modems, ISDN (Integrated Services Digital Network) and so on. It is further assumed that the presentation data for the session/call is available offline to the computing device 10 (and associated personal application(s)). This may be achieved by downloading the presentation data to the computing device 10 when such a high-speed data connection is available or by accessing previously stored presentation data from removable media such as a floppy, CD (Compact Disc) or DVD (Digital Video Disc), or a removable hard disk and the like. Utilizing one or more embodiments of the invention, the participant(s) of the call/session would view the presentation data on computing device 10 in synchronization with the remotely located presenter/server 5 without benefit of a traditional "video conferencing" or computer-based conferencing capability or even, a high-speed packet data connection.

As mentioned, to take advantage of the invention, the presenter/server 5 would not need to be connected in a high-speed data connection to computing device 10. The computing device 10 would instead receive synchronization commands from and send synchronization feedback to the mobile communication device 30 using the associated ports 15 and 35 and pathway 20. Exemplary synchronization commands include messages indicating the current slide number, or file name of data being presented, page numbers, mouse coordinates, screen coordinates, and the like. Using the synchronization commands, the computing device 10, with the aid of an applet, would use the synchronization commands forwarded by the mobile communication device 30 to automatically or manually control the personal productivity application. As a result, the presentation data shown by the personal productivity application would be synchronized with the presenter/server 5. This synchronization could be achieved in real-time (granting network latency). Synchronization feedback would likewise be forwarded to the mobile communication device 30 and then onto the presenter/server 5 using the same described mechanism.

Figure 2:
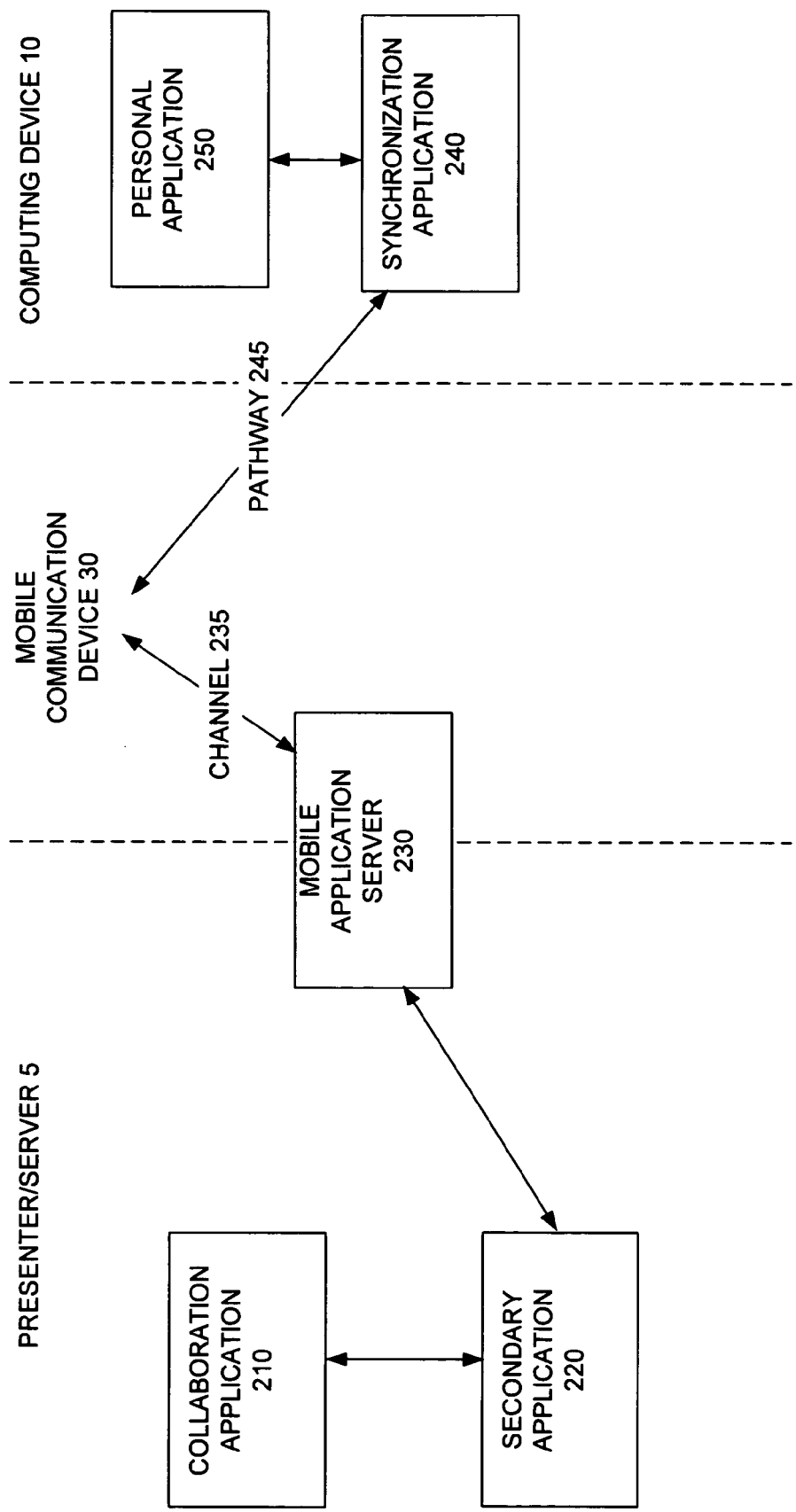
FIG. 2 is an application diagram according to some embodiments of the invention.

FIG. 2 is an application diagram according to some embodiments of the invention. The presenter/server 5 runs a collaboration application 210 and a secondary application 220. The collaboration application 210 is conferencing and/or call management software (which may include whiteboarding and other features) which establishes and manages a data collaboration session and/or conference call. Collaboration application 210 may include software such as OpenScape®, LiveMeeting™, NetMeeting™ and WebEx™. Collaboration application 210 is launched either automatically (through task scheduling or similar means) or by a user having access to presenter/server 5. The collaboration application 210 configures and initiates a session with a plurality of participants. Each of the participants will have computing device 10 and some of the participants may also have a mobile communication device 30. Those participants who do not have access to a high-speed network connection can use their mobile communication device 30 as a gateway to send/receive synchronization information (such as commands and feedback). If collaboration application 210 does not provide the service already, a secondary application 220 such as an applet or plug-in is utilized to assist in communicating synchronization information with mobile communication device 30. OpenScape® can be configured, for instance, with a service that can connect to a mobile application server 230. Mobile application server 230 is an application server which may be present in or accessible by a base station of a cellular network or other communications relaying and networking center. One example is IMS (IP Multimedia Subsystem). IMS is an application server, developed by Siemens AG, that was designed to communicate data to 3Gpp cellular telephones. IMS allows interworking and communication amongst IP-based networks, cellular technologies (such as GSM) and wired telephony technologies (such as PSTN) and thus enables a rich variety of data (such as voice, voice-over-IP, video, video-over-IP, instant messages, text, files, and applications to be passed from one to another). The mobile application server 230 may also be available to presenter/server 5 via a data network such as the Internet.

The mobile application server 230 can communicate over some network which can access a channel 235 which can transact messages and data with one ore mobile communication devices 30. Channel 235 may include a cellular network, satellite network or access to the above networks though another network such as a packet-switched or circuit-switched network or a gateway or a combination of these, as needed. Channel 235 is intended also to represent cellular base station, base station sub-system, switches, relays, repeaters and the like which are in the network path terminating at mobile communication device 30. Channel 235 would also include provisioning for data channels and messaging channels (such as SMS) which are provided in addition to the voice provisioning for mobile communication device 30. The configuration of such networks is well-known in the art. Channel 235 is used to communicate synchronization information from mobile application server 230 to/from mobile communication device 30.

Synchronization commands received by mobile communication device 30 are sent over a pathway 245 to a synchronization application 240 running on computing device 10. Pathway 245 includes wireless (such as IrDA or Bluetooth) or wired interfaces (such as USB) between mobile communication device 30 and computing device 10. Devices 10 and 30 would have physical ports as well which can handle this interfacing in a compatible or interoperable fashion (e.g. ports 15 and 35 of FIG. 1). As mentioned above, if mobile communication device 30 and computing device 10 were integrated into one hardware platform, the need for an explicit external pathway would be eliminated. Synchronization application 240 would be configured to receive/send data over the physical port which communicates on pathway 245. Personal application 250 includes applications such as browsers, Adobe Acrobat, PowerPoint, Microsoft Word, Excel and the like which enable a user to view/edit/save/print presentation data. As discussed above, it is assumed that the presentation data is available for access by personal application 250 in a manner such that it does not need to be downloaded/accessed in real-time from a network location, but is readily available on computing device 10 or some device directly connected to computing device 10 as a peripheral thereof. Synchronization application 240 can utilize synchronization commands it receives from pathway 245 to direct the personal application 250 to perform some action changing the state in the local copy of the presentation data to match that of the presentation data in the presenter/server 5. For instance, the synchronization command may direct the personal application 250 to forward ahead one page or slide in the presentation data. Synchronization application 240 can also be used to collect and forward synchronization feedback from personal application 250 or the user of computing device 10. This feedback may involve mouse or cursor movements, and the like. Such feedback can be sent via pathway 245 through the mobile communication device 30 onto mobile application server 230 and back to the presenter/server 5 through secondary application 220.

Figure 3:
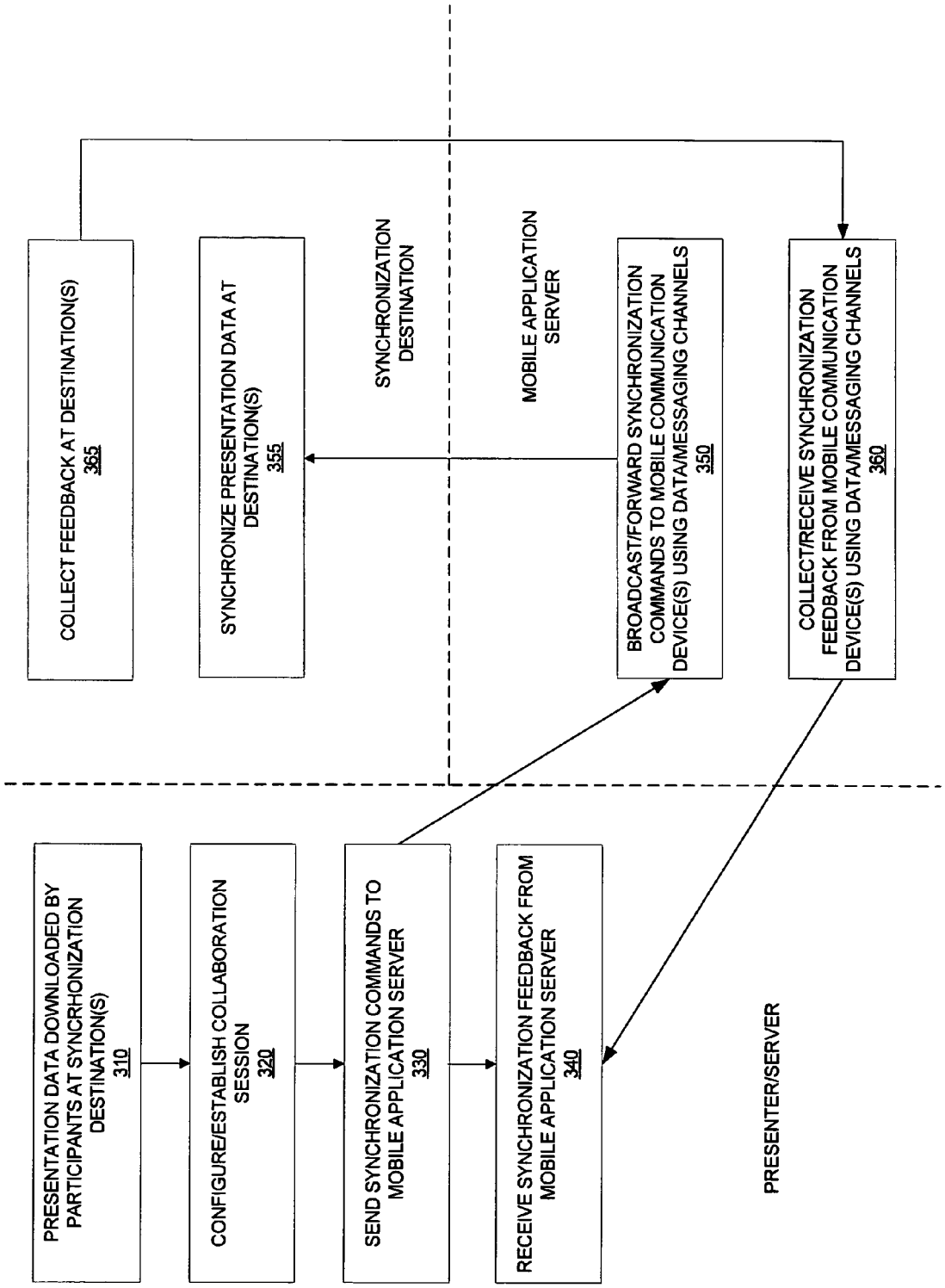
FIG. 3 is a flowchart of synchronization according to some embodiments of the invention.

FIG. 3 illustrates a process flow for sending/receiving synchronization information with participants in a collaboration session according to at least one embodiment of the invention. At any time prior to the commencement of the collaboration session, presentation data is downloaded by participants at one or more synchronization destinations (block 310). The synchronization destination may be, for instance, a laptop. Presentation data such as a PowerPoint slide presentation could be e-mailed to the user of the synchronization destination while that user has or is accessing a network connection or could be sent physically using removable media. This allows the presentation data to be available locally so that it need not be downloaded during the collaboration session. While FIG. 3 shows the presenter/server sending the presentation data to participants, data can be made available or sent by any suitable entity or file system. The presenter/server next configures and establishes a collaboration session which may include voice, video, text and/or presentation data such as slides or other documents (block 320). The configuration would include a list of the participants, the synchronization destinations and if any participants do not have high-speed network access, an associated mobile communication device.

Once the collaboration session is started, synchronization commands can be sent to a mobile application server on an as needed basis (block 330). For instance, if the presenter/server is advancing forward to another page or document in the presentation, a synchronization command that indicates this change in state can be sent to all or some of the participants. The mobile application server then either broadcasts or forwards the synchronization commands to mobile communication device(s) using data and/or messaging channels (block 350). Using the forwarded synchronization commands, the presentation data at the synchronization destinations is synchronized with the presenter/server (block 355). The process for synchronization at the synchronization destination is set forth and described in the co-pending related patent application "Apparatus and Method for a Synchronized Mobile Communication Client" identified above. The process blocks 330, 350 and 355 can be repeated throughout the collaboration session as needed, especially when there are state changes in the presentation data at the presenter/server.

Likewise, according to some embodiments of the invention, synchronization feedback can be received at any time during pendency of the collaboration session (block 340). The feedback is generated by the participants and collected at one or more destinations (block 365). This enables collaboration sessions to be interactive so that participants can be active rather than passive. The feedback is received/collected by the mobile application server via the mobile communication device's data and/or messaging channels with which it has communicative capability (block 360). This feedback can be used by the presenter/server to utilize, act upon or simply acknowledge conduct by the participant. The process for collecting synchronization feedback at the synchronization destination is set forth and described in the co-pending related patent application "Apparatus and Method for a Synchronized Mobile Communication Client" identified above. Blocks 340, 360 and 365 can be repeated throughout the collaboration session as needed.

Figure 4:
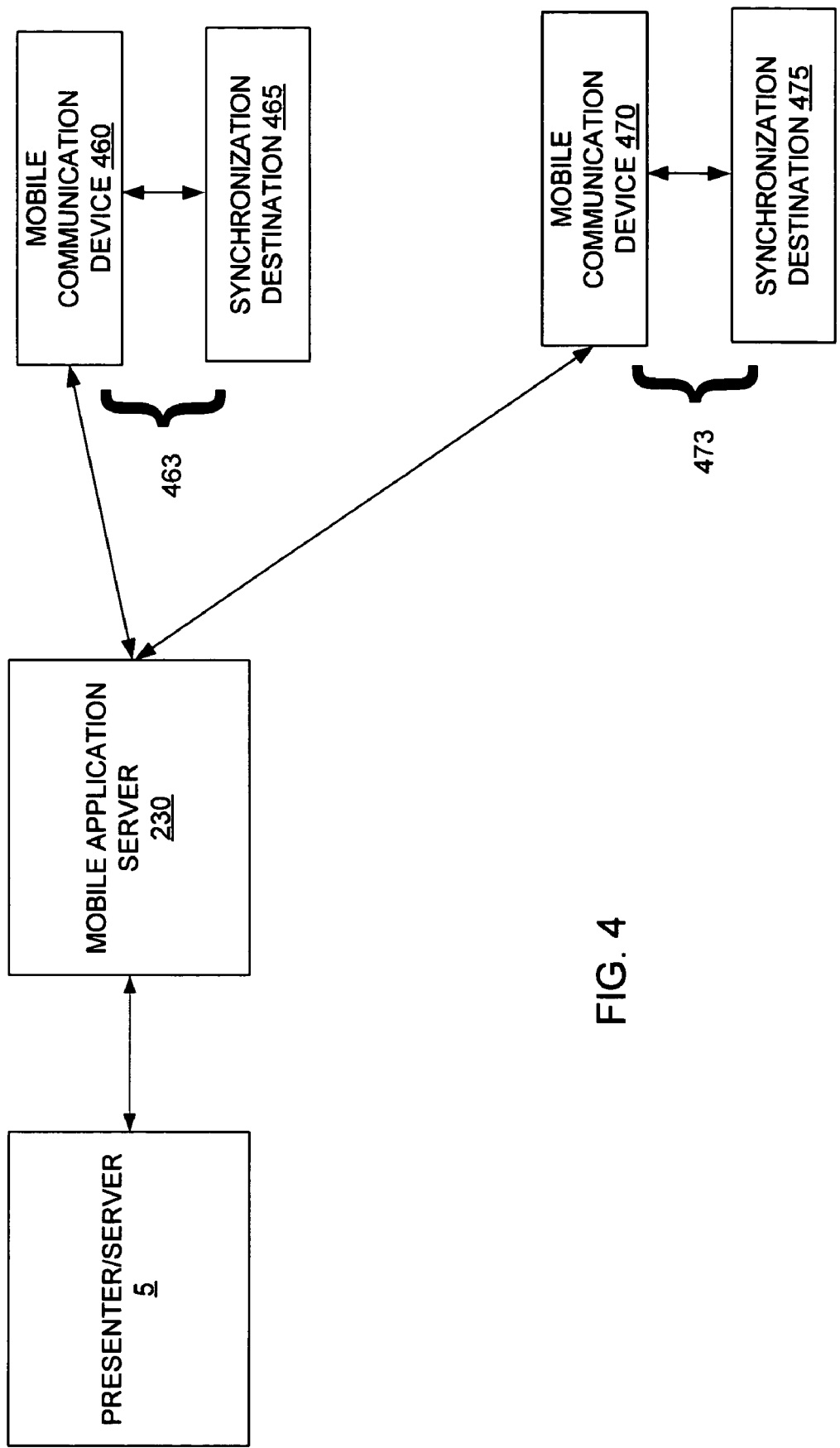
FIG. 4 is a block diagram of broadcast synchronization according to some embodiments of the invention.

FIG. 4 illustrates multi-participant synchronization according to at least one embodiment of the invention. In a collaboration session, there are typically many participants. FIG. 4 shows two such participants, both of which do not have high-speed network access. In accordance with the invention, presentation data which is previously sent to the participants can be synchronized with the presenter/server (who manages the collaboration session). A first participant 463 has an associated mobile communication device 460 and synchronization destination 465 with which it can communicate. Likewise, the collaboration session supports a second participant 473 which also has an associated mobile communication device 470 and synchronization destination 475 with which it can communicate. Though only two participants are shown, this is by way of illustration only. Any number of participants may be involved in the collaboration session, some of whom have devices like synchronization destination 465 and mobile communication device 460 and others of whom may have a high-speed network connection with which they can receive presentation data in real-time from presenter/server 5.

Once the collaboration session has begun, the presentation data at the presenter/server 5 may change state. For instance, the state change can involve moving from one page/file of the presentation data and the next. This state change can be reflected nearly instantaneously for participants viewing the presentation data from the presenter/server 5 over a high speed data connection. However, for other participants, such as 463 and 473 shown in FIG. 4, the invention provides a method and apparatus for synchronizing local copies of the presentation data with the state of the presentation data at the presenter/server 5. Once a state change occurs at presenter/server 5, a synchronization command is sent to mobile application server 230. Mobile application server 230 can then broadcast or be used as a gateway to forward this synchronization command to mobile communication devices 460 and 470, and hence, to both of the participants 463 and 473, respectively. The mobile communication device 460 forwards this synchronization command to synchronization destination 465. Likewise, mobile communication device 470 forwards the same or similar synchronization command to synchronization destination 475. The synchronization destinations 465 and 475 use this synchronization command to effectuate a state change in a local copy of the presentation data. Thus, the state of the presentation data local to the synchronization destinations 465 and 475 is "synchronized" with the state of presentation data at presenter/server 5. For instance, a change in state may involve a slideshow presentation moving ahead 5 slides. The synchronization command may represent this state change with a indication to "move ahead 5 slides" or merely with an indication of the updated new slide number. The synchronization process is covered in more detail in the co-pending related patent application "Apparatus and Method for a Synchronized Mobile Communication Client" identified above.

Figure 5:
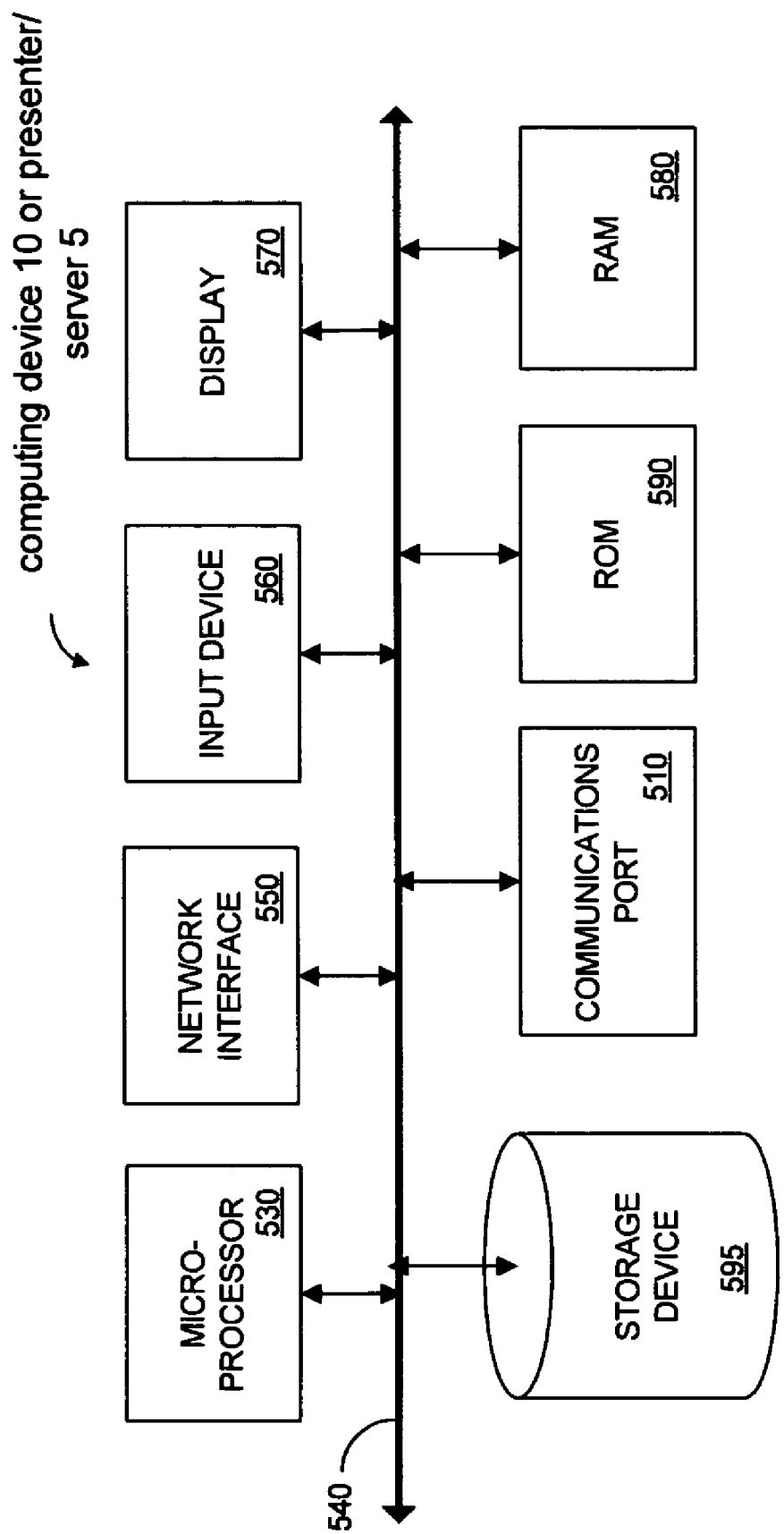
FIG. 5 is a block diagram of the internal architecture of a computing device or presenter server according to some embodiments of the invention.

FIG. 5 is a representative block diagram of computing device 10 or presenter/server 5 according to some embodiments. First, operation as computing device 10 will be described in detail, and then, operation as presenter/server 5 will be described. Many operating details in the description of elements computing device 10, below, can also be applied when those elements combine to operate as presenter/server 5.

Computing device 10 may comprise a single device or computer, a networked set or group of devices or computers, such as a workstation, laptop etc. Computing device 10 is typical of a synchronization destination which has presentation data available prior to the start of a collaboration session. Computing device 10 of FIG. 5 includes microprocessor 530 in communication with communication bus 540. Microprocessor 530 is used to execute processor-executable process steps so as to control the components computing device 10 to provide functionality according to embodiments of the present invention. Microprocessor 530 may comprise a Pentium™, Itanium™ microprocessor manufactured by Intel Corporation. Other suitable processors may be available from Motorola, Inc., AMD, or Sun Microsystems, Inc. Microprocessor 530 also may comprise one or more microprocessors, controllers, memories, caches and the like.

Input device 560 and display 570 are also in communication with communication bus 540. Any known input device may be used as input device 560, including a keyboard, mouse, touch pad, voice-recognition system, or any combination of these devices. Input device 560 may be used by a user to input information and commands to computing device 10.

Display 570 may be an integral or separate CRT display, a flat-panel display or the like. Display 570 is generally used to output graphics and text to an operator in response to commands issued by microprocessor 530. Display 570 may display presentation data and the like which is used during the collaboration session.

RAM (Random Access Memory) 580 is connected to communication bus 540 to provide microprocessor 530 with fast data storage and retrieval. In this regard, processor-executable process steps being executed by microprocessor 530 are typically stored temporarily in RAM 580 and executed therefrom by microprocessor 530. ROM (Read Only Memory) 590, in contrast, may provide storage from which data can be retrieved but to which data cannot be stored. Accordingly, ROM 590 may be used to store invariant process steps and other data, such as basic input/output instructions and data used during system boot-up or to control input device 560. One or both of RAM 580 and ROM 590 may communicate directly with microprocessor 530 instead of over communication bus 540, or on separate dedicated busses.

Data storage device 595 stores, among other data, processor-executable process steps of personal application 250 synchronization application 240, collaboration session client applications and so on (see FIG. 2). The process steps and program code of synchronization application 240 and personal application 250 may be read from a computer-readable medium, such as a floppy disk, a CD-ROM, a DVD-ROM, a Zip™ disk, a magnetic tape, or provided as a signal from such media encoding the process steps/program code, and then stored in data storage device 595 in a raw, compressed, uncompiled and/or encrypted format. In alternative embodiments, hard-wired circuitry may be used in place of, or in combination with, processor-executable process steps for implementation of the processes described herein. Thus, embodiments are not limited to any specific combination of hardware, firmware and software.

Also illustrated is a network interface 550 which may be a wired or wireless Ethernet interface, a modem interface, and so on. In utilizing the various embodiments of the invention, the network interface 550 is assumed not to be connected to or to provide or access a high-speed connection to the Internet or an Intranet providing access to the Internet or similar networks. Without an ability to receive and send data in a high speed or high bandwidth manner, it is further assumed that the computing device 10 is therefore unable to receive presentation data in real-time over network interface 550 during the collaboration session.

It is further assumed, therefore, that a copy of the presentation data is already available locally on computing device 10 when the collaboration session has commenced. The presentation data copy may be stored on data storage 595 or read from a computer-readable medium, such as a floppy disk, a CD-ROM, a DVD-ROM, a Zip™ disk, a magnetic tape, or accessed from a connected secondary storage device such as USB hard drive and the like. The computing device 10 loads the copy of the presentation data using personal application 250 (or in connection with or as a sub-application of a collaboration client). When so instructed by synchronization commands, computing device 10 synchronizes the local copy of presentation data with a presenter/server of the collaboration session using synchronization application 240. The synchronization command is forwarded from a mobile communication device (such as mobile communication device 30 of FIG. 1) to the computing device 10 over a communications port 510. Communications port 510 is a data or signaling port/interface which allows communication with other connectable peripheral devices such as printers, scanners, modems, disk drives, PDAs, cellular telephones, input devices and so on. Communications port 510 may be at least one of or a combination of ports such as IrDA ports, serial ports, parallel ports, Bluetooth ports, USB ports and the like. Though shown as a single-port, communications port 510 is merely representative of one of many such communication ports that a computing device 10 may possess. In accordance with the invention, synchronization commands and feedback are sent to and received from a mobile communication device using communications port 510. The mobile communication device will also have the same, compatible and/or interoperable interface as communications port 210 for facilitating such transfers. As mentioned above, a mobile communication capability such as CDMA or GSM may be integrated into computing device 10. In such cases, communications port 510 would not need to be used for communicating synchronization information since there would be device-internal data transfer available.

Stored in data storage device 595 may also be other elements that may be necessary for operation of computing device 10, such as other applications, other data files, a network server, an operating system, a database management system and "device drivers" for allowing microprocessor 530 to interface with external devices. These elements are known to those skilled in the art, and are therefore not described in detail herein.

FIG. 5 may also represent a presenter/server 5. In such embodiments, the presenter/server 5 is also a computing device but with a network interface 550 that does have a high speed and/or high bandwidth connection to the Internet, or an Intranet providing access to same and the like. The presenter/server 5 would use network interface 550 to send synchronization commands to and receive synchronization feedback from the mobile application server. Presenter/server 5 would also run applications such as the collaboration application 210 and secondary application 220 using program code loaded into RAM 580 and executed by microprocessor 530. Code and data for these applications as well as presentation data and the like can be stored on data storage 595 and the like.

The particular arrangements of process steps described above are not meant to imply a fixed order; embodiments can be practiced in any order that is practicable. The processes described herein may be embodied as program code developed using an object-oriented language that allows the modeling of complex systems with modular objects to create abstractions that are representative of real world, physical objects and their interrelationships. However, embodiments may be implemented in many different ways using a wide range of programming techniques as well as hardwired in hardware systems or dedicated controllers. In addition, in some embodiments, many, if not all, of the elements described above are optional or can be combined into single elements.

Any embodiments described above are not intended to be limited to the specific form set forth herein, but are intended to cover such alternatives, modifications and equivalents as can reasonably be included within the spirit and scope of the appended claims.

What is claimed is:

1. A system for a collaboration session involving a plurality of participants, said system comprising:
a presentation server at a presenter server location and identified as a master presenter, said presentation server establishing and configuring one or more collaboration sessions with identified session participants and presenting presentation data in each collaboration session, wherein said presentation data comprises slides and said presentation data is configured with an identification of said master presenter, a file name corresponding to said presentation data and identification of synchronization destinations, said presentation server further configured to send synchronization commands to an application server in a telecommunications network and receive remote synchronization commands from said application server, said sent synchronization commands representative of a change in state of said presentation data at said presenter server location, said presentation data at said presenter server location further changing state in said presentation server responsive to said received remote synchronization commands; and
a presentation client device at each of said synchronization destinations providing a synchronized presentation for each of some of said participants, each said presentation client device having a local copy of said presentation data prior to said synchronized presentation and receiving said sent synchronization commands forwarded from said application server, wherein said sent synchronization commands enable synchronization of the local copy of said presentation data with the presentation data at said presenter server location, at least one of said synchronization destinations selectively returning said remote synchronization commands to said application server;
wherein said sent synchronization commands and said returned remote synchronization commands include messages indicating current slide number, file name of data being presented, page numbers, mouse coordinates, and screen coordinates; and
wherein said presentation client devices at each of said synchronization destinations include at least one of a laptop computer, a desktop computer, a handheld computer, a PDA and a cellular telephone with browsing capability.

2. A system according to claim 1 further comprising:
a mobile telecommunications device coupled to said presentation client device in at least one said synchronization destination, said mobile telecommunications device acting to forward synchronization commands received over said telecommunications network from said application server to the coupled presentation client device, said presentation client device selectively returning said remote synchronization commands through said mobile communication device.

3. A system according to claim 2, wherein said application server comprises:
a mobile application server configured to communicate with said presentation server, said mobile application server forwarding said synchronization commands originating from said presenter/server location over said telecommunications network to each said mobile telecommunications device and receiving said remote synchronization commands received from said mobile telecommunications device at said at least one synchronization destination.

4. A system according to claim 3 wherein said mobile application server is coupled to at least one wireless telecommunications network, said at least one wireless telecommunications network capable of communicating with said mobile telecommunications device.

5. A system according to claim 3 wherein said mobile application server is an IP Multimedia Subsystem server.

6. A system according to claim 2 wherein said application server forwards said synchronization commands to, and receives said remote synchronization commands from, said mobile telecommunications device through its data channel in said telecommunications network.

7. A system according to claim 2 wherein said application server forwards said synchronization commands to, and receives said remote synchronization commands from, said mobile telecommunications device through its signaling channel in said telecommunications network.

8. A system according to claim 2 wherein said application server forwards said synchronization commands and receives said remote synchronization commands through a data network in said telecommunications network.

9. A system according to claim 2 wherein said mobile telecommunications device includes at least one of a cellular telephone, a satellite telephone and a PDA.

10. A system according to claim 1 wherein said presentation server runs a collaboration application which establishes, configures and manages each said collaboration session, wherein said collaboration session further includes voice, video and text communications with said presentation data.

11. A system according to claim 10 wherein said presentation server runs a secondary application enabling said collaboration application to send synchronization commands to said application server, and wherein said presentation data includes slides.

12. A system according to claim 1 wherein said presentation server is further configured to receive said remote synchronization commands as synchronization feedback from participants, said synchronization feedback representative of inputs from said participants.

13. A system according to claim 1, wherein at least one said synchronization destination has mobile telecommunications capability.

14. A system according to claim 13, wherein said application server comprises:
a mobile application server configured to communicate with said presentation server, said mobile application server forwarding said synchronization commands originating from said presenter/server location over said telecommunications network to each said synchronization destination and receiving said remote synchronization commands over said telecommunications network from said at least one presentation client devices.

15. A system according to claim 14 wherein said mobile application server is coupled to at least one wireless telecommunications network, said at least one wireless telecommunications network capable of communicating with said synchronization destination through its mobile telecommunications capability.

16. A system according to claim 14 wherein said mobile application server is an IP Multimedia Subsystem server.

17. A system according to claim 13 wherein said application server forwards said synchronization commands to, and receives said remote synchronization commands from, said synchronization destination using the data channel in said telecommunications network associated with its mobile telecommunications capability.

18. A system according to claim 13 wherein said application server forwards said synchronization commands to, and receives said remote synchronization commands from, said synchronization destination using the signaling channel in said telecommunications network associated with its mobile telecommunications capability.

19. A system according to claim 13 wherein said application server forwards said synchronization commands and receives said remote synchronization commands through a data network in said telecommunications network.

20. A system according to claim 13 wherein said mobile telecommunications capability includes at least one of a cellular capability, radio frequency capability and a satellite capability.

21. A system according to claim 13 wherein said presentation client device is a computing device and the local copy is e-mailed to said computing device prior to commencing the collaboration session.

22. A method during a collaboration session for synchronizing copies of a presentation data, the method comprising:
establishing and configuring on a presentation server identified as a master presenter a collaboration session with at least one presentation client device identified with session participants;
presenting presentation data wherein said presentation data comprises slides and wherein said presentation data is configured with an identification of a said master presenter, a file name corresponding to said presentation data and identification of synchronization destinations with said session participants, said presentation data changing state in said presentation server at a presenter server location responsive to input at said presentation server and remote synchronization commands from at least one of said synchronization destinations, each participating presentation client device including a local copy of said presentation data for synchronized presentation;
sending from said presentation server a plurality of synchronization commands to an application server in a telecommunications network;
forwarding said synchronization commands from said application server over said telecommunications network to a respective presentation client device at each of one or more said synchronization destinations participating in said collaboration session, said synchronization commands representing a change of state in said presentation data at said presentation server, said at least one synchronization destination being one of said one or more synchronization destinations; and presenting a synchronized presentation at the presentation client devices utilizing said synchronization commands, said synchronization commands synchronizing the state of local copies of said presentation data to match that of the presentation data at the presentation server;

wherein said remote synchronization commands and said synchronization commands include messages indicating current slide number, file name of data being presented, page numbers, mouse coordinates, and screen coordinates; and wherein said presentation client devices at each of said one or more synchronization destinations include at least one of a laptop computer, a desktop computer, a handheld computer, a PDA and a cellular telephone with browsing capability.

23. A method according to claim 22 further comprising:
sending said copies from said presentation server to said presentation client devices at said synchronization destinations prior to commencement of said collaboration session.

24. A method according to claim 22, said presentation server establishing said collaboration session with said presentation client devices responsive to said collaboration session being configured on said presentation server.

25. A method according to claim 22, wherein said synchronization commands include messages indicating current slide number, file name of data being presented, page numbers, mouse coordinates, and screen coordinates and are forwarded to, and said remote synchronization commands are received from, a mobile telecommunications device.

26. A method according to claim 25, wherein said application server is a mobile application server forwarding said synchronization commands over said telecommunications network to, and receiving said remote synchronization commands over said telecommunications network from, said mobile telecommunications device.

27. A method according to claim 26 wherein said mobile application server is coupled to at least one wireless telecommunications network, said at least one wireless telecommunications network capable of communicating with said mobile telecommunications device.

28. A method according to claim 26 wherein said mobile application server is an IP Multimedia Subsystem server.

29. A method according to claim 25 wherein said mobile telecommunications device includes at least one of a cellular telephone, a satellite telephone and a PDA.

30. A method according to claim 22 wherein client devices at synchronization destinations include at least one of a laptop computer, a desktop computer, a handheld computer, a PDA and a cellular telephone with browsing capability.

31. A method according to claim 22 further comprising:
receiving at said presentation server said remote synchronization commands as synchronization feedback, said synchronization feedback representing presentation inputs by said participants.

32. A method according to claim 31 further comprising:
receiving said synchronization feedback from a mobile telecommunications device.

33. A method according to claim 32, wherein said application server is a mobile application server forwarding said synchronization feedback to said presentation server.

34. A method according to claim 33 wherein said mobile application server is coupled to at least one wireless telecommunications network, said at least one wireless telecommunications network capable of communicating with said mobile telecommunications device.

35. A method according to claim 33 wherein said mobile application server is an IP Multimedia Subsystem server.

36. A method according to claim 32 wherein said mobile telecommunications device includes at least one of a cellular telephone, a satellite telephone and a PDA.

37. A method according to claim 32, wherein said application server forwards said synchronization commands over said telecommunications network to, and receives said remote synchronization commands over said telecommunications network from, a mobile telecommunications capability at said synchronization destination.

38. A method according to claim 37, wherein said application server is a mobile application server forwarding said synchronization commands over said telecommunications network to, and receives said remote synchronization commands over said telecommunications network from, said synchronization destination through its mobile telecommunications capability.

39. A method according to claim 38 wherein said mobile application server is coupled to at least one wireless telecommunications network, said at least one wireless telecommunications network capable of communicating with said mobile telecommunications capability of said synchronization destination.

40. A method according to claim 38 wherein said mobile application server is an IP Multimedia Subsystem server.

41. A method according to claim 37 wherein said mobile telecommunications capability includes at least one of a cellular capability and a satellite capability.

42. A method according to claim 22 wherein said presentation client device is a computing device and the local copy is e-mailed to said computing device prior to commencing the collaboration session.

43. A method according to claim 22 further comprising:
receiving at said presentation server said remote synchronization commands as synchronization feedback, said synchronization feedback representing presentation inputs by said participants.

44. A method according to claim 43 further comprising:
receiving said synchronization feedback from a mobile telecommunications device.

45. A method according to claim 44, wherein said application server is a mobile application server forwarding said synchronization feedback to said presentation server.

46. A method according to claim 45 wherein said mobile application server is coupled to at least one wireless telecommunications network, said at least one wireless telecommunications network capable of communicating with said mobile telecommunications device.

47. A method according to claim 45 wherein said mobile application server is an IP Multimedia Subsystem server.

48. A method according to claim 44 wherein said mobile telecommunications device includes at least one of a cellular telephone, a satellite telephone and a PDA.

49. An apparatus for synchronizing copies of a presentation data presented in said apparatus comprising a non-transitory computer-readable medium having instructions stored thereon which when executed cause:

establishing and configuring on a presentation server identified as a master presenter a collaboration session with presentation client devices, each at a synchronization destination identified with one or more session participants;

presenting presentation data at said presentation server, wherein said presentation data comprises slides and said presentation data is configured with an identification of a master presenter, a file name corresponding to said presentation data and identification of synchronization destinations;

changing state at a presenter server location responsive to input at said presentation server and remote synchronization commands from at least one said synchronization destination, each participating presentation client device including a local copy of said presentation data for synchronized presentation;

sending from said presentation server a plurality of synchronization commands to an application server in a telecommunications network;

forwarding said synchronization commands from said application server over said telecommunications network to one or more said presentation client devices at said synchronization destinations participating in said collaboration session, said synchronization commands representing a change of state in said presentation data at said presenter server location, said at least one synchronization destination being one of said synchronization destinations; and participating presentation client devices utilizing said synchronization commands and responsive to said synchronization commands synchronizing the state of local copies of said presentation data to match that of the presentation data at the presentation server;

wherein said remote synchronization commands and said synchronization commands include messages indicating current slide number, file name of data being presented, page numbers, mouse coordinates, and screen coordinates; and wherein said presentation client devices at each of said one or more synchronization destinations include at least one of a laptop computer, a desktop computer, a handheld computer, a PDA and a cellular telephone with browsing capability.

50. An apparatus according to claim 49 further causing:
sending said copies from said presentation server to said presentation client devices at prior to commencement of said collaboration session.

51. An apparatus according to claim 49 further causing:
said presentation server to establish said collaboration session with said participating presentation client devices responsive to said collaboration session being configured on said presentation server.

52. An apparatus according to claim 49 further causing said application server to forward said synchronization commands over said telecommunications network to, and receive said remote synchronization commands over said telecommunications network from, a mobile telecommunications device.

53. An apparatus according to claim 52, wherein said application server is a mobile application server forwarding said synchronization commands over said telecommunications network to, and receiving said remote synchronization commands over said telecommunications network from, said mobile telecommunications device.

54. An apparatus according to claim 53 wherein said mobile application server is coupled to at least one wireless telecommunications network, said at least one wireless telecommunications network capable of communicating with said mobile telecommunications device.

55. An apparatus according to claim 53 wherein said mobile application server is an IP Multimedia Subsystem server.

56. An apparatus according to claim 52 wherein said mobile telecommunications device includes at least one of a cellular telephone, a satellite telephone and a PDA.

57. An apparatus according to claim 52 further causing:
receiving said synchronization feedback from a mobile telecommunications device.

58. An apparatus according to claim 57, wherein said application server is a mobile application server forwarding said synchronization feedback to said presentation server.

59. An apparatus according to claim 58, wherein said mobile application server is coupled to at least one wireless telecommunications network, said at least one wireless telecommunications network capable of communicating with said mobile telecommunications device.

60. An apparatus according to claim 58, wherein said mobile application server is an IP Multimedia Subsystem server.

61. An apparatus according to claim 49 wherein said client devices at synchronization destinations include at least one of a laptop computer, a desktop computer, a handheld computer, a PDA and a cellular telephone with browsing capability.

62. An apparatus according to claim 49 further causing:
receiving at said presentation server said remote synchronization commands as synchronization feedback, said synchronization feedback representing presentation inputs by said participants.

63. An apparatus according to claim 62 further causing:
receiving said synchronization feedback from a mobile telecommunications device.

64. An apparatus according to claim 63, wherein said application server is a mobile application server forwarding said synchronization feedback to said presentation server.

65. An apparatus according to claim 64 wherein said mobile application server is coupled to at least one wireless telecommunications network, said at least one wireless telecommunications network capable of communicating with said mobile telecommunications device.

66. An apparatus according to claim 64 wherein said mobile application server is an IP Multimedia Subsystem server.

67. An apparatus according to claim 63 wherein said mobile telecommunications device includes at least one of a cellular telephone, a satellite telephone and a PDA.

68. An apparatus according to claim 63 further causing said application server to forward said synchronization commands over said telecommunications network to, and receiving said remote synchronization commands over said telecommunications network from, a mobile telecommunications capability at said synchronization destination.

69. An apparatus according to claim 68, wherein said application server is a mobile application server forwarding said synchronization commands over said telecommunications network to, and receiving said remote synchronization commands over said telecommunications network from, said synchronization destination through its mobile telecommunications capability.

70. An apparatus according to claim 69 wherein said mobile application server is coupled to at least one wireless telecommunications network, said at least one wireless telecommunications network capable of communicating with said mobile telecommunications capability of said synchronization destination.

71. An apparatus according to claim 69 wherein said mobile application server is an IP Multimedia Subsystem server.

72. An apparatus according to claim 68 wherein said mobile telecommunications capability includes at least one of a cellular capability and a satellite capability.

73. An apparatus according to claim 72 wherein said mobile telecommunications device includes at least one of a cellular telephone, a satellite telephone and a PDA.

74. An apparatus according to claim 49 wherein said presentation comprises slides, synchronization commands include messages indicating current slide number, file name of data being presented, page numbers, mouse coordinates, and screen coordinates, said presentation client device is a computing device and the local copy is e-mailed to said computing device prior to commencing the collaboration session.

75. An apparatus according to claim 49 further causing:
   receiving at said presentation server said remote synchronization commands as synchronization feedback, said synchronization feedback representing presentation inputs by said participants.

* * * * *